(12) United States Patent
Lee et al.

(10) Patent No.: US 10,875,966 B2
(45) Date of Patent: Dec. 29, 2020

(54) POLYARYLENE SULFIDE AND A PREPARATION METHOD THEREOF

(71) Applicant: SK CHEMICALS CO., LTD., Gyeonggi-do (KR)

(72) Inventors: Se-Ho Lee, Gyeonggi-do (KR); Sung-Gi Kim, Gyeonggi-do (KR)

(73) Assignee: SK Chemicals Co., Ltd, Seongnam (KR)

( * ) Notice: Subject to any disclaimer, the term of this patent is extended or adjusted under 35 U.S.C. 154(b) by 77 days.

(21) Appl. No.: 16/175,485

(22) Filed: Oct. 30, 2018

(65) Prior Publication Data

US 2019/0062505 A1    Feb. 28, 2019

Related U.S. Application Data

(63) Continuation of application No. 14/420,017, filed as application No. PCT/KR2013/007081 on Aug. 6, 2013, now abandoned.

(30) Foreign Application Priority Data

Aug. 7, 2012  (KR) .................. 10-2012-0086423

(51) Int. Cl.
| | |
|---|---|
| *C08L 81/02* | (2006.01) |
| *C08G 75/14* | (2006.01) |
| *C08G 75/02* | (2016.01) |
| *C08L 81/04* | (2006.01) |

(52) U.S. Cl.
CPC ............. *C08G 75/14* (2013.01); *C08G 75/02* (2013.01); *C08L 81/02* (2013.01); *C08L 81/04* (2013.01)

(58) Field of Classification Search
CPC ......... C08L 81/04; C08L 81/02; C08G 75/14; C08G 75/0263
See application file for complete search history.

(56) References Cited

U.S. PATENT DOCUMENTS

| | | | |
|---|---|---|---|
| 4,769,424 A | 9/1988 | Takekoshi et al. | |
| 4,826,956 A | 5/1989 | Fagerburg et al. | |
| 4,877,851 A | 10/1989 | Fagerburg et al. | |
| 5,155,183 A | 10/1992 | Arnold, III et al. | |
| 5,175,243 A | 12/1992 | Ash | |
| 5,328,980 A * | 7/1994 | Decker ................ | C08G 75/025 528/388 |
| 2006/0270793 A1 | 11/2006 | Tokushige et al. | |
| 2009/0203872 A1 | 8/2009 | Lee et al. | |
| 2011/0269935 A1 | 11/2011 | Shin et al. | |
| 2015/0141550 A1 | 5/2015 | Kang et al. | |
| 2015/0197605 A1 | 7/2015 | Lee et al. | |
| 2015/0353687 A1 | 12/2015 | Shin et al. | |
| 2016/0340473 A1 | 11/2016 | Lee et al. | |

FOREIGN PATENT DOCUMENTS

| | | |
|---|---|---|
| CN | 101578322 | 11/2009 |
| CN | 101595165 | 12/2009 |
| CN | 102341434 | 2/2012 |
| EP | 0053344 | 6/1982 |
| EP | 0486014 | 5/1992 |
| EP | 0549977 | 7/1993 |
| EP | 2383308 | 11/2011 |
| EP | 2511344 | 10/2012 |
| EP | 2546279 | 1/2013 |
| EP | 2546280 | 1/2013 |
| EP | 2546281 | 1/2013 |
| EP | 2570449 | 3/2013 |
| EP | 2578637 | 4/2013 |
| EP | 2634206 | 9/2013 |
| JP | H02-286719 | 11/1990 |
| JP | H04-500086 | 1/1992 |
| JP | H04-506228 | 10/1992 |
| JP | H06-234854 | 8/1994 |
| JP | H11-171997 | 6/1999 |
| JP | H11-171998 | 6/1999 |
| JP | 2008-144002 | 6/2008 |
| JP | 2015-524014 | 8/2015 |
| WO | WO 89/08674 | 9/1989 |
| WO | WO 2010/010760 | 1/2010 |
| WO | WO 2011/070968 | 6/2011 |

OTHER PUBLICATIONS

International Search Report prepared by the Korean Intellectual Property Office dated Oct. 20, 2013, for International Application No. PCT/KR2013/007081.
Extended Search Report for European Patent Application No. 13828420.3, dated Mar. 31, 2016, 10 pages.
Official Action for U.S. Appl. No. 14/420,017, dated Oct. 16, 2015.
Official Action for U.S. Appl. No. 14/420,017, dated Jun. 22, 2016.
Official Action for U.S. Appl. No. 14/420,017, dated Mar. 2, 2017 10 pages.
Official Action for U.S. Appl. No. 14/420,017, dated Sep. 28, 2017 7 pages.
Official Action for U.S. Appl. No. 14/420,017, dated Apr. 30, 2018 7 pages.

(Continued)

*Primary Examiner* — Gregory Listvoyb

(74) *Attorney, Agent, or Firm* — Sheridan Ross P.C.

(57) ABSTRACT

The present invention relates to a polyarylene sulfide having more improved miscibility with other polymer materials or fillers, and a method of preparing the same. At least part of end groups of the main chain of the polyarylene sulfide is carboxyl group (—COOH) or amine group (—NH$_2$).

14 Claims, No Drawings

(56) References Cited

OTHER PUBLICATIONS

Official Action for U.S. Appl. No. 15/228,832, dated Sep. 5, 2017 11 pages.
Official Action for U.S. Appl. No. 15/228,832, dated May 10, 2018 9 pages.

* cited by examiner

POLYARYLENE SULFIDE AND A PREPARATION METHOD THEREOF

CROSS REFERENCE TO RELATED APPLICATIONS

This application is a continuation of U.S. patent application Ser. No. 14/420,017 which is a national stage application under 35 U.S.C. 371 and claims the benefit of PCT Application No. PCT/KR2013/007081 having an international filing date of Aug. 6, 2013, which designated the United States, which PCT application claimed the benefit of Korean Patent Application No. 10-2012-0086423 filed Aug. 7, 2012, the disclosures of each of which are incorporated herein by reference in their entirety.

TECHNICAL FIELD

The present invention relates to a polyarylene sulfide having more improved compatibility with other polymer materials or fillers, and a method of preparing the same.

BACKGROUND OF THE INVENTION

Now, polyarylene sulfide is a representative engineering plastic, and the demand for the products being used in a high temperature and corrosive environment or the electronic goods is increasing due to its high heat resistance and chemical resistance, flame resistance, electric insulation, and so on.

Among the polyarylene sulfides, polyphenylene sulfide (PPS) is one and only commercially on sale now. The commercial preparation process of PPS being applicable until now is the method of carrying out a solution polymerization of p-dichlorobenzene (pDCB) and sodium sulfide in a polar organic solvent such as N-methylpyrrolidone. The method is known as Macallum process.

However, when the polyarylene sulfide is prepared by such Macallum process, a salt type by-product may be formed in a solution polymerization process using sodium sulfide, and thus there is a disadvantage of requiring a washing or drying process for eliminating a salt type by-product or a residual organic solvent. Furthermore, since the polyarylene sulfide prepared by such Macallum process is a powder form, the post processability and workability may decrease.

Accordingly, a method of melt-polymerizing the reactants including diiodoaromatic compounds and sulfur element was suggested as the method of preparing the polyarylene sulfide such as PPS and the like. Such method does not form a salt type by-product and not use an organic solvent in the preparation process of the polyarylene sulfide, and thus it does not require an additional process for eliminating them. Furthermore, since the polyarylene sulfide prepared finally has a pellet form, there is an advantage of easy post processability and good workability.

However, in the case of the polyarylene sulfide prepared by the melt-polymerization method, the ends of the main chain were composed of iodine and most aryl groups (representatively, benzene). Therefore, there was a disadvantage of that such polyarylene sulfide was inferior in the compatibility with other polymer materials or all sorts of reinforcements or fillers like glass fiber and the like due to the characteristics of its main chain structure.

Due to this, it was hard to compound the polyarylene sulfide prepared by the melt-polymerization method with other polymer materials or fillers for securing optimized properties suitable to various uses, and it was difficult to show optimized properties even if it was compounded with them.

DETAILS OF THE INVENTION

Objects of the Invention

It is an aspect of the present invention to prepare a polyarylene sulfide having more improved compatibility with other polymer materials or fillers, and a method of preparing the same.

It is another aspect of the present invention to provide a shaped article including the polyarylene sulfide.

Technical Means

The present invention provides a polyarylene sulfide of which at least part of end groups of the main chain is carboxyl group (—COOH) or amine group (—$NH_2$).

The present invention also provides a method of preparing polyarylene sulfide, including the steps of: polymerizing a reactant including a diiodoaromatic compound and sulfur element; and adding a compound having carboxyl group or amine group thereto while carrying out the polymerization step.

The present invention also provides a shaped article including the polyarylene sulfide resin.

Hereinafter, the polyarylene sulfide according to specific embodiment of the invention, the preparation method thereof, and the shaped article including the same are explained in more detail. However, the embodiment is provided only for an example of the invention, and the scope of the invention is not limited to or by them and it is obvious to a person skilled in the art that various modifications are possible in the scope of the invention.

In this description, "include" or "comprise" means to include any components (or ingredients) without particular limitation unless there is no particular mention about them, and it cannot be interpreted as a meaning of excluding an addition of other components (or ingredients).

According to one embodiment of the invention, a polyarylene sulfide of which at least part of end groups of the main chain is carboxyl group (—COOH) or amine group (—$NH_2$) is provided.

The present inventors accomplished the present invention, in the course of studying the method of preparing a polyarylene sulfide having better compatibility with other polymer materials or fillers which can be compounded with various materials and can realize optimized properties suitable to various uses, in the process of preparing a polyarylene sulfide by melt-polymerizing a reactant including a diiodoaromatic compound and sulfur element.

From the research of the present inventors, it is recognized that the polyarylene sulfide prepared by prior melt-polymerization method has the ends of the main chain composed of iodine and most aryl groups (representatively, benzene) and there is substantially no functional group in the main chain, and thus there is a disadvantage of that such polyarylene sulfide is inferior in the compatibility with other polymer materials, all sorts of reinforcements such as glass fiber and the like, or fillers.

However, it is recognized that the polyarylene sulfide of one embodiment shows good compatibility with other polymer materials or fillers, since reactive functional groups such as carboxyl group (—COOH) or amine group (—$NH_2$) are introduced to at least part of the ends of the main chain of the same. Consequently, the polyarylene sulfide of one embodiment can be suitably compounded with various polymer materials or fillers, and makes it possible to provide a resin composition and a shaped article showing the optimized properties suitable to various uses. Simultaneously with this, the polyarylene sulfide can show good heat resistance and chemical resistance, and excellent mechanical properties unique to the polyarylene sulfide.

The polyarylene sulfide of one embodiment may show the peak of about 1600 to 1800 cm$^{-1}$ derived from carboxyl groups of the ends of the main chain or the peak of about 3300 to 3500 cm$^{-1}$ derived from amine group, in a FT-IR spectrum, when it is analyzed with FT-IR spectroscopy. At this time, the intensity of the peak of 1600 to 1800 cm$^{-1}$ or the peak of 3300 to 3500 cm$^{-1}$ may correspond to the amount of carboxyl groups or amine groups connected to the ends of main chain.

According to one example, in the FT-IR spectrum of the polyarylene sulfide of one embodiment, if the height of the ring stretch peak shown at about 1400 to 1600 cm$^{-1}$ is assumed as the intensity of 100%, the relative height intensity of the peak of about 1600 to 1800 cm$^{-1}$ or about 3300 to 3500 cm$^{-1}$ may be about 0.001 to 10%, about 0.01 to 7%, about 0.1 to 4%, or about 0.5 to 3.5%. At this time, the ring stretch peak shown at 1400 to 1600 cm$^{-1}$ may be what is derived from the arylene group such as phenylene and the like included in the main chain of the polyarylene sulfide. Since the height intensity of the peak of about 1600 to 1800 cm$^{-1}$ derived from carboxyl groups or the peak of about 3300 to 3500 cm$^{-1}$ derived from amine groups is about 0.001 to 10%, about 0.01 to 7%, about 0.1 to 4%, or about 0.5 to 3.5% in comparison to the height intensity of the peak derived from the arylene group (for example, phenylene group), the polyarylene sulfide of one embodiment can show good compatibility with other polymer materials or fillers and can maintain excellent properties unique to the polyarylene sulfide.

Meanwhile, the melting temperature of the polyarylene sulfide of one embodiment may be about 265 to 290° C., about 270 to 285° C., or about 275 to 283° C. Because of such melting temperature range, the polyarylene sulfide of one embodiment obtained by melt-polymerization method, to which carboxyl group or amine group is introduced, can show excellent heat resistance and flame retardance.

And, the number average molecular weight of the polyarylene sulfide may be about 5,000 to 50,000, about 8,000 to 40,000, or about 10,000 to 30,000. The polydispersity index defined as the weight average molecular weight divided by the number average molecular weight may be about 2.0 to 4.5, about 2.0 to 4.0, or about 2.0 to 3.5. Because the polyarylene sulfide of one embodiment has such polydispersity index and molecular weight range, it can show excellent mechanical properties and processability and can be processed into various shaped articles for various uses.

Furthermore, above polyarylene sulfide of one embodiment may have the melt viscosity of about 10 to 50,000 poise, about 100 to 20,000, or about 300 to 10,000, which is measured with a rotational viscometer at 300° C. The polyarylene sulfide of one embodiment having such melt viscosity can show superior mechanical properties in company with excellent processability.

For example, the polyarylene sulfide of one embodiment may have the tensile strength of about 100 to 900 kgf/cm$^2$, about 200 to 800 kgf/cm$^2$, or about 300 to 700 kgf/cm$^2$, which is measured according to ASTM D 638, and the elongation of about 1 to 10%, about 1 to 8%, or about 1 to 6%, which is measured according to ASTM D 638. Furthermore, the polyarylene sulfide of one embodiment may have the flexural strength of about 100 to 2,000 kgf/cm$^2$, about 500 to 2,000 kgf/cm$^2$, or about 1,000 to 2,000 kgf/cm$^2$, which is measured according to ASTM D 790, and the impact strength of about 1 to 100 J/m, about 5 to 50 J/m, or about 10 to 20 J/m, which is measured according to ASTM D 256. Like this, the polyarylene sulfide of one embodiment can show good compatibility with other polymer materials or fillers and can exhibit excellent properties.

The polyarylene sulfide of one embodiment may show good compatibility with various thermoplastic resins such as polyvinylalcohol-based resins, vinylchloride-based resins, polyamide-based resins, polyolefin-based resins, polyester-based resins, and the like; various thermoplastic elastomers such as polyvinylchloride-based elastomers, polyolefin-based elastomers, polyurethane-based elastomers, polyester-based elastomers, polyamide-based elastomers, polybutadiene-based elastomers, and the like; or various reinforcements/fillers such as glass fiber, carbon fiber, boron fiber, glass bead, glass flake, talc, calcium carbonate, and the like. Therefore, above polyarylene sulfide of one embodiment can be compounded with other various polymer materials or fillers and show excellent synergistic effect, and it becomes possible to realize the properties optimized to various purposes.

As an example, it was recognized that the elongation was elevated about 10 times from about 2.2% to about 25.2%, the impact strength was elevated about 3 times from about 17 J/m to about 54 J/m by compounding about 90 weight % of the polyarylene sulfide of one embodiment of which carboxyl group is introduced to the end group of the main chain, and about 10 weight % of thermoplastic elastomer. Furthermore, it was recognized that the tensile strength was largely elevated from about 602 kgf/cm$^2$ to about 1750 kgf/cm$^2$ by compounding about 60 weight % of the polyarylene sulfide of one embodiment of which amine group is introduced to the end group of the main chain, and about 40 weight % of glass fiber. Therefore, it can be known from the improved properties caused by such compounding that the polyarylene sulfide of one embodiment can show good compatibility with other various polymer materials or fillers, and consequently can exhibit excellent synergistic effects.

When the polyarylene sulfide of one embodiment is compounded with other polymer materials or fillers, it is preferable to mix about 10 to 99 weight % or about 50 to 90 weight % of the polyarylene sulfide and about 1 to 90 weight % or about 10 to 50 weight % of one or more components selected from the group consisting of thermoplastic resin, thermoplastic elastomers, and fillers. A shaped article having excellent properties preferable to various uses can be prepared by shaping such mixture with a method of biaxial extrusion and the like.

Meanwhile, according to another embodiment of the invention, a method of preparing the polyarylene sulfide is provided. Such method of another embodiment may include the steps of polymerizing a reactant including a diiodoaromatic compound and sulfur element; and adding a compound having carboxyl group or amine group thereto while carrying out the polymerization step.

In the preparation method of another embodiment, the compound having carboxyl group or amine group may be added thereto when the degree of polymerization reaction of the diiodoaromatic compound and sulfur element is progressed about 90% or more, or about 90% or more and less than 100%, (for example, in the latter part of the polymerization reaction), wherein the degree of polymerization reaction is determined by the ratio of present viscosity to target viscosity. The degree of polymerization reaction can be determined as the ratio of present viscosity to target viscosity. For this, an objective molecular weight of the polyarylene sulfide and a target viscosity corresponding to the objective molecular weight are set up, and the present viscosity according to the degree of polymerization reaction is measured. At this time, the present viscosity may be differently measured by a method well-known to a person skilled in the art in accordance with the scale of reactor. For example, when the polymerization is carried out in a relatively small polymerization reactor, it may be measured by using a viscometer after taking a sample from the reactor where the polymerization reaction is progressing. On the other hand, when the reaction is carried out in a huge continuous polymerization reaction, the present viscosity may be measured continuously in real time with a viscometer installed in the reactor itself.

Like this, the polyarylene sulfide of one embodiment of which carboxyl group (—COOH) or amine group (—$NH_2$) is introduced to at least part of end groups of the main chain can be prepared by adding and reacting the compound having carboxyl group or amine group in the latter part of the polymerization reaction of the reactant including the diiodoaromatic compound and sulfur element. Particularly, since the compound having carboxyl group or amine group is added in the latter part of the polymerization reaction, proper amount of carboxyl group or amine group can be introduced to the end groups of the main chain, and the polyarylene sulfide of one embodiment having not only good compatibility with other polymer materials or fillers but also excellent properties unique to the polyarylene sulfide can be prepared effectively.

Meanwhile, in the preparation method of another embodiment, an arbitrary monomer compound having carboxyl group or amine group may be used as the compound having carboxyl group or amine group. As the examples of the compound having carboxyl group or amine group, 2-iodobenzoic acid, 3-iodobenzoic acid, 4-iodobenzoic acid, 2,2'-dithiobenzoic acid, 2-iodoaniline, 3-iodoaniline, 4-iodoaniline, 2,2'-dithiodianiline, or 4,4'-dithiodianiline may be used, and various compounds having carboxyl group or amine group can be used in addition.

Furthermore, the compound having carboxyl group or amine group may be added thereto in the amount of about 0.0001 to 5 parts by weight, about 0.001 to 3 parts by weight, or about 0.01 to 2 parts by weight, based on 100 parts by weight of the diiodoaromatic compound. Proper amount of carboxyl group or amine group can be introduced to the end groups of the main chain by adding such amount of the compound having carboxyl group or amine group, and consequently, the polyarylene sulfide of one embodiment having not only good compatibility with other polymer materials or fillers but also excellent properties unique to the polyarylene sulfide can be prepared effectively.

Meanwhile, in the preparation method of another embodiment, the polyarylene sulfide is prepared basically by the method of polymerizing the reactant including the diiodoaromatic compound and sulfur element, and consequently, the polyarylene sulfide having superior mechanical properties to prior Macallum process can be prepared.

At this time, the diiodoaromatic compound may be one or more compounds selected from the group consisting of diiodobenzene (DIB), diiodonaphthalene, diiodobiphenyl, diiodobisphenol, and diiodobenzophenone, but not limited to or by them, diiodoaromatic compounds that alkyl group or sulfone group is connected to above compounds as a substituent or an oxygen or nitrogen atom is included in the aromatic group may also be used. There are various diiodocompound isomers of diiodoaromatic compounds depending on the position of iodine atoms, and a compound having iodine at para-position like para-diiodobenzene (pDIB), 2,6-diiodonaphthalene, or p,p'-diiodobiphenyl may be used more preferably.

And, the form of sulfur element which reacts with the diiodoaromatic compound is not limited particularly. Generally, sulfur elements exist in a cyclooctasulur (S8) form in which 8 atoms are connected at room temperature. However, if not such form, any solid type or liquid type sulfur which can be used commercially may be used without particular limitation.

Furthermore, the reactant may further include a polymerization initiator, a stabilizer, or a mixture thereof. As the polymerization initiator, one or more initiator selected from the group consisting of 1,3-diiodo-4-nitrobenzene, mercaptobenzothiazole, 2,2'-dithiobenzothiazole, cyclohexylbenzothiazole sulfenamide, and butylbenzothiazole sulfonamide may be used, for example, but it is not limited to or by them.

And, common stabilizer for polymerization reaction or resins may be used as the stabilizer unlimitedly.

Meanwhile, during the polymerization reaction, a polymerization inhibitor may be added thereto at the time when the polymerization is somewhat progressed. At this time, any polymerization inhibitor which can terminate the polymerization by eliminating iodine group included in the polymerized polymer can be used without particular limitation. Specifically, one or more compounds selected from the group consisting of diphenyl suldife, diphenyl ether, diphenyl, benzophenone, dibenzothiazole disulfide, monoiodoaryl compound, benzothiazoles, benzothiazolesulfenamides, thiurams, dithiocarbamates, and diphenyl disulfide may be used.

More preferably, the polymerization inhibitor may be one or more compounds selected from the group consisting of iodobiphenyl, iodophenol, iodoaniline, iodobenzophenone, 2-mercaptobenzothiazole, 2,2'-dithiobisbenzothiazole, N-cyclohexylbenzothiazole-2-sulfenamide, 2-morpholinothiobenzothiazole, N,N-dicyclohexylbenzothiazole-2-sulfenamide, tetramethylthiuram monosulfide, tetramethylthiuram disulfide, zinc dimethyldithiocarbamate, zinc diethyldithiocarbamate, and diphenyl disulfide may be used.

Meanwhile, the time of adding the polymerization inhibitor may be determined by considering the molecular weight of the polyarylene sulfide to be polymerized finally. For example, the inhibitor may be added at the time of that about 70 to 100 wt % of the diiodoaromatic compound included in the initial reactant are reacted and exhausted.

And, the polymerization reaction may be carried out in any condition which can initiate the polymerization of the reactants including the diiodoaromatic compound and sulfur element. For example, the polymerization reaction may be carried out in a temperature-rising and pressure-reducing reaction condition. At this time, the condition may be carried out for about 1 to 30 hrs while varying the temperature and pressure condition from the initial reaction condition of about 180 to 250° C. and about 50 to 450 torr to the final reaction condition of about 270 to 350° C. and about 0.001 to 20 torr. For more concrete example, the polymerization reaction may be carried out with the final reaction condition of about 280 to 300° C. and 0.1 to 0.5 torr.

Meanwhile, the preparation method of the polyarylene sulfide according to another embodiment may further include the step of melt-compounding the reactants including the diiodoaromatic compound and sulfur element before the polymerization reaction. The condition of the melt-compounding is not limited as long as all of the reactants are melted and compounded, and for example, the process may be carried out at the temperature of about 130° C. to 200° C., or about 160° C. to 190° C.

Like this, by carrying out the melt-compounding step before the polymerization reaction, it is possible to carry out succeeding polymerization reaction more easily.

Furthermore, in the preparation method of polyarylene sulfide according to another embodiment, the polymerization reaction may be carried out in the presence of a nitrobenzene-based catalyst. And, when the melt-compounding step is carried out before the polymerization reaction as disclosed above, the catalyst may be added in the melt-compounding step. As the nitrobenzene-based catalyst, 1,3-diiodo-4-nitrobenzene, or 1-iodo-4-nitrobenzene may be used but it is not limited to or by them.

According to still another embodiment of the invention, a shaped article including the polyarylene sulfide of above embodiment is provided. The shaped article may solely consist of the polyarylene sulfide or may further include other polymer materials and/or reinforcements/fillers. The polyarylene sulfide shows excellent compatibility with other polymer materials and/or reinforcements/fillers, and makes it possible to provide a resin composition or a shaped article having superior properties by being mixed (for example, compounded) with them. At this time, the polymer materials and/or reinforcements/fillers which can be compounded with the polyarylene sulfide are same as disclosed above.

Such shaped article may include about 10 to 99 weight % or about 50 to 90 weight % of the polyarylene sulfide and about 1 to 90 weight % or about 10 to 50 weight % of one or more components selected from the group consisting of thermoplastic resin, thermoplastic elastomers, and fillers. And, by shaping the resin composition satisfying above content range with a method such as biaxial extrusion, the shaped article having excellent properties and applicable to various uses can be obtained.

The shaped article of still another embodiment may be various shapes of film, sheet, fiber, and the like. And, the shaped article may be an injection molded article, an extruded article, or a blown article. In the injection molding process, the mold temperature may be about 50° C. or more, about 60° C. or more, or about 80° C. or more in the aspect of crystallization, and the temperature may be about 190° C. or less, about 170° C. or less, or about 160° C. or less in the aspect of deformation of specimen.

And, if the shaped article is a film or a sheet, it may be made into an undrawn, a uniaxially drawn, or a biaxially drawn film or sheet. If it is a fiber, it may be made into an undrawn, a drawn, or an ultradrawn fiber, and it may be used to a fabric, a knit, a nonwoven (spunbond, meltblown, or staple), a rope, or a net.

Such shaped articles may be used to electric & electronic parts such as computer parts, architectural elements, car parts, machine parts, daily necessities, coating parts to which chemical materials contact, industrial chemical resistant fiber, and the like.

In the present invention, further details besides the disclosure above may be added and subtracted with necessity, and they are not limited particularly in the present invention.

Effects of the Invention

The present invention can provide a melt-polymerized polyarylene sulfide having excellent compatibility with other polymer materials or reinforcements/fillers because of carboxyl group or amine group included at the end of the main chain.

Such polyarylene sulfide can exhibit excellent properties optimized to various uses and excellent properties unique to the polyarylene sulfide by being compounded with other various polymer materials or fillers.

Therefore, such polyarylene sulfide can be applied to various uses including the use of compounding, and can exhibit excellent properties and effects.

DETAILED DESCRIPTION OF THE EMBODIMENT

Hereinafter, preferable examples are presented for understanding the present invention. However, the following examples are only for illustrating the present invention and the present invention is not limited to or by them.

Example 1: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was carried out for 1 hr. Subsequently, after adding 51 g of 4-iodobenzoic acid thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 1 was analyzed by FT-IR spectroscopy. At this time, the carboxyl group peak was recognized at about 1600 to 1800 $cm^{-1}$ in the spectrum. It was also recognized that the relative height intensity of the peak at about 1600 to 1800 $cm^{-1}$ was about 3.4% when the height intensity of the ring stretch peak shown at about 1400 to 1600 $cm^{-1}$ was assumed as 100%.

Example 2: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was carried out for 1 hr. Subsequently, after adding 51 g of 4-iodoaniline thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 2 was analyzed by FT-IR spectroscopy. At this time, the amine group peak was recognized at about 3300 to 3500 $cm^{-1}$ in the spectrum. It was also recognized that the relative height intensity of the peak at about 3300 to 3500 $cm^{-1}$ was about 1.4% when the height intensity of the ring stretch peak shown at about 1400 to 1600 $cm^{-1}$ was assumed as 100%.

Example 3: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was carried out for 1 hr. Subsequently, after adding 25 g of 4-iodobenzoic acid thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 3 was analyzed by FT-IR spectroscopy. At this time, the carboxyl group peak was recognized at about 1600 to 1800 $cm^{-1}$ in the spectrum. It was also recognized that the relative height intensity of the peak at about 1600 to 1800 $cm^{-1}$ was about 2.1% when the height intensity of the ring stretch peak shown at about 1400 to 1600 $cm^{-1}$ was assumed as 100%.

Example 4: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was carried out for 1 hr. Subsequently, after adding 25 g of 4-iodoaniline thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 4 was analyzed by FT-IR spectroscopy. At this time, the amine group peak was recognized at about 3300 to 3500 $cm^{-1}$ in the spectrum. It was also recognized that the relative height intensity of the peak at about 3300 to 3500 $cm^{-1}$ was about 1.1% when the height intensity of the ring stretch peak shown at about 1400 to 1600 $cm^{-1}$ was assumed as 100%.

Example 5: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was carried out for 1 hr. Subsequently, after adding 51 g of 2,2'-dithiodibenzoic acid thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 5 was analyzed by FT-IR spectroscopy. At this time, the carboxyl group peak was recognized at about 1600 to 1800 $cm^{-1}$ in the spectrum. It was also recognized that the relative height intensity of the peak at about 1600 to 1800 $cm^{-1}$ was about 3.2% when the height intensity of the ring stretch peak shown at about 1400 to 1600 $cm^{-1}$ was assumed as 100%.

Example 6: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was carried out for 1 hr. Subsequently, after adding 51 g of 4,4'-dithiodianiline thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 6 was analyzed by FT-IR spectroscopy. At this time, the amine group peak was recognized at about 3300 to 3500 $cm^{-1}$ in the spectrum. It was also recognized that the relative height intensity of the peak at about 3300 to 3500 $cm^{-1}$ was about 1.3% when the height intensity of the ring stretch peak shown at about 1400 to 1600 $cm^{-1}$ was assumed as 100%.

Example 7: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was carried out for 1 hr. Subsequently, after adding 25 g of 2,2'-dithiodibenzoic acid thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 7 was analyzed by FT-IR spectroscopy. At this time, the carboxyl group peak was recognized at about 1600 to 1800 $cm^{-1}$ in the spectrum. It was also recognized that the relative height intensity of the peak at about 1600 to 1800 $cm^{-1}$ was about 1.9% when the height intensity of the ring stretch peak shown at about 1400 to 1600 $cm^{-1}$ was assumed as 100%.

Example 8: Synthesis of Polyarylene Sulfide Including Carboxyl Group or Amine Group at the End of the Main Chain After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was carried out for 1 hr. Subsequently, after adding 25 g of 4,4'-dithiodianiline thereto when the reaction was proceeded 90% and progressing the reaction under nitrogen circumstance for 10 mins, the reaction was further progressed with slowly vacuumizing to 0.5 torr or less for 1 hr, and terminated. By this, the polyarylene sulfide resin having carboxyl group or amine group at the end of the main chain was synthesized. The final resin obtained by the reaction was prepared into pellets by using a small strand cutter.

The polyarylene sulfide resin of Example 8 was analyzed by FT-IR spectroscopy. At this time, the amine group peak was recognized at about 3300 to 3500 $cm^{-1}$ in the spectrum. It was also recognized that the relative height intensity of the peak at about 3300 to 3500 $cm^{-1}$ was about 1.0% when the height intensity of the ring stretch peak shown at about 1400 to 1600 $cm^{-1}$ was assumed as 100%.

Comparative Example 1

After completely melting and mixing the reactant including 5,130 g of p-diiodobenzene (p-DIB), 450 g of sulfur, and 4 g of 1,3-diiodo-4-nitrobenzene as a reaction initiator in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. and 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%], and the present viscosity was measured with a viscometer after taking a sample from the reactor where the polymerization reaction was progressing), 25 g of 2,2'-dithiobisbenzothiazole was added thereto as a polymerization inhibitor and the reaction was progressed under nitrogen circumstance for 10 mins, and the reaction was further progressed with slowly vacuumizing to 0.5 torr or less and terminated when the viscosity reached the target viscosity. By this, the polyarylene sulfide resin having neither carboxyl group nor amine group at the end of the main chain was synthesized. The final resin obtained by the reaction was prepared into pellets by using a small strand cutter.

The polyarylene sulfide resin of Comparative Example 1 was analyzed by FT-IR spectroscopy. At this time, it was recognized that there was neither carboxyl group peak nor amine group peak at about 1600 to 1800 $cm^{-1}$ or about 3300 to 3500 $cm^{-1}$ in the spectrum.

Comparative Example 2

Product name Z200 of DIC Co., Ltd. in which the polyarylene sulfide made by Macallum process was compounded with an elastomer was used as Comparative Example 2.

Experimental Example 1: Evaluation on Basic Properties of Polyarylene Sulfide

The properties of polyarylene sulfides of Examples 1 to 8 and Comparative Example 1 were evaluated by the following methods:

Melting Temperature (Tm)

By using a differential scanning calorimeter (DSC), after elevating the temperature of the specimen from 30° C. to 320° C. with a scanning speed of 10° C./min and cooling to 30° C., the melting temperature was measured while elevating the temperature from 30° C. to 320° C. again with a scanning speed of 20° C./min.

Number Average Molecular Weight (Mn) and Polydispersity Index (PDI)

After dissolving the polyarylene sulfide in 1-chloronaphthalene at 250° C. for 25 minutes with stirring so as to be 0.4 wt % solution, the polyarylene sulfide was divided in order in the column of a high temperature gel permeation chromatography (GPC) system (210° C.) by flowing the solution with the flow rate of 1 mL/min, and the intensity corresponding to the molecular weight of the divided polyarylene sulfide was measure by using a RI detector. After making a calibration line with a standard specimen (polystyrene) of which the molecular weight was known, the relative number average molecular weight (Mn) and polydispersity index (PDI) of the measure sample was calculated.

Melt Viscosity (Poise)

The melt viscosity (hereinafter, 'M.V.') was measured at 300° C. by using a rotating disk viscometer. In frequency sweep measuring method, angular frequency was measured from 0.6 to 500 rad/s, and the viscosity at 1.84 rad/s was defined as the melt viscosity (M.V.).

The properties measured according to above methods are listed in the following Table 1:

TABLE 1

| Classification | Melting temperature (° C.) | Number Average Molecular Weight | Polydispersity Index (PDI) | Melt Viscosity (Poise) |
|---|---|---|---|---|
| Example 1 | 278.6 | 17,667 | 2.9 | 2,940 |
| Example 2 | 278.3 | 17,614 | 2.9 | 2,200 |
| Example 3 | 278.8 | 17,435 | 2.8 | 2,830 |
| Example 4 | 278.6 | 17,224 | 2.8 | 2,770 |
| Example 5 | 277.5 | 17,338 | 2.9 | 2,350 |
| Example 6 | 277.7 | 17,152 | 2.9 | 2,930 |
| Example 7 | 278.3 | 17,531 | 2.8 | 2,470 |
| Example 8 | 278.7 | 17,582 | 2.8 | 2,530 |
| Comparative Example 1 | 280.5 | 17,267 | 2.8 | 2,420 |

Experimental Example 2: Evaluation on Mechanical Properties of Polyarylene Sulfide The mechanical properties of polyarylene sulfides of Examples 1 to 8 and Comparative Example 1 were evaluated by the following methods:

Tensile Strength and Elongation

The tensile strength and the elongation of the polyarylene sulfide specimens prepared according to Examples 1 to 8 and Comparative Example 1 were measured according to ASTM D 638 method.

Flexural Strength

The flexural strength of the polyarylene sulfide specimens prepared according to Examples 1 to 8 and Comparative Example 1 were measured according to ASTM D 790 method.

Impact Strength (Izod)

The impact strength of the polyarylene sulfide specimens prepared according to Examples 1 to 8 and Comparative Example 1 was measured according to ASTM D 256 method.

The mechanical properties measured according to above methods are listed in the following Table 2:

TABLE 2

| Classification | Tensile Strength ($kgf/cm^2$) | Elongation (%) | Flexural Strength ($kgf/cm^2$) | Impact Strength (J/m, Notched) |
|---|---|---|---|---|
| Example 1 | 612 | 2.2 | 1,430 | 17 |
| Example 2 | 602 | 1.2 | 1,422 | 20 |
| Example 3 | 622 | 2.1 | 1,433 | 18 |
| Example 4 | 614 | 1.3 | 1,442 | 17 |
| Example 5 | 628 | 2.2 | 1,455 | 18 |
| Example 6 | 605 | 1.2 | 1,428 | 17 |
| Example 7 | 611 | 2.3 | 1,435 | 17 |
| Example 8 | 618 | 1.3 | 1,447 | 19 |
| Comparative Example 1 | 605 | 1.2 | 1,453 | 19 |

The specimens were prepared by compounding the polyarylene sulfide of Examples 1 to 8 and Comparative Example 1 with other components according to the following methods:

Compounding of Polyarylene Sulfide and Glass Fiber (GF)

After drying the polymerized resin, the compounding was carried out with a small twin-screw extruder under the condition of the extrusion die temperature of 300° C. and the screw speed of 200 rpm while adding 40 parts by weight of glass fiber to 60 parts by weight of the resin.

Compounding of Polyarylene Sulfide and Elastomer

The mixing extrusion was carried out under the condition of the extrusion die temperature of 300° C. and the screw speed of 200 rpm while adding 10 parts by weight of Lotader (Grade AX-8840, made by Arkema), the elastomer, to 90 parts by weight of the resin.

The mechanical properties of the compounded specimens were evaluated by the same way as the polyarylene sulfide specimens and are listed in the following Table 3. Furthermore, the properties of the specimen of Comparative Example 2, a commercialized compounded specimen, are compared with Examples and Comparative Example 1 in the following Table 3:

TABLE 3

| Classification | Tensile Strength (kgf/cm$^2$) | Elongation (%) | Flexural Strength (kgf/cm$^2$) | Impact Strength (J/m, Notched) |
|---|---|---|---|---|
| Example 1 + Elastomer 10% | 583 | 25.2 | 1,030 | 54 |
| Example 2 + GF 40% | 1,750 | 1.8 | 2,440 | 85 |
| Example 3 + Elastomer 10% | 577 | 20.5 | 1,010 | 48 |
| Example 4 + GF 40% | 1,740 | 1.8 | 2,400 | 83 |
| Example 5 + Elastomer 10% | 564 | 24.3 | 1,010 | 52 |
| Example 6 + GF 40% | 1,770 | 1.8 | 2,480 | 86 |
| Example 7 + Elastomer 10% | 568 | 18.7 | 1,005 | 45 |
| Example 8 + GF 40% | 1,750 | 1.8 | 2,420 | 82 |
| Comparative Example 1 + Elastomer 10% | 556 | 2.5 | 950 | 17 |
| Comparative Example 1 + GF 40% | 1,700 | 1.7 | 2,300 | 77 |
| Comparative Example 2 | 660 | 15.7 | 940 | 76 |

According to Tables 2 and 3, it was recognized that the elongation was elevated about 10 times from about 2.2% to about 25.2 and the impact strength was elevated about 3 times from about 17 J/m to about 54 J/m by compounding the polyarylene sulfide of Example 1 of which carboxyl group is introduce to the end of the main chain with the thermoplastic elastomer. And, it was recognized that the tensile strength was largely elevated from about 602 kgf/cm$^2$ to about 1750 kgf/cm$^2$ by compounding the polyarylene sulfide of Example 2 of which amine group is introduced to the end group of the main chain with glass fiber. Therefore, it can be known from the properties elevated by such compounding that the polyarylene sulfides of Examples can show good compatibility with other various polymer materials or fillers, and consequently can exhibit excellent synergistic effects.

On the other hand, it was recognized that the polyarylene sulfide of Comparative Example 1 was inferior in the compatibility with other polymer materials or fillers and the synergistic effects caused by compounding was not so big.

Furthermore, the compounded specimen of Comparative Example 2 was a commercialized specimen prepared by compounding the polyarylene sulfide which was obtained by Macallum process and was known to be good in the compatibility with other polymer materials and several % of elastomer. However, such compounded specimen of Comparative Example 2 also showed not enough elongation improvement by compounding with elastomer, in comparison with Examples, and it seems to have the problems (deterioration in processability and workability due to the powder form) of polyarylene sulfide obtained by Macallum process.

The invention claimed is:

1. A polyarylene sulfide of which at least part of end groups of the main chain is carboxyl group (—COOH), and the remainder of the end groups is iodine group or unsubstituted aryl group,
    wherein the polyarylene sulfide is prepared by a method including the steps of:
    melt-polymerizing a reactant including a diiodoaromatic compound and elemental sulfur; and
    adding a compound having carboxyl group while carrying out the melt-polymerization step, wherein the compound having carboxyl group includes one or more compounds selected from the group consisting of 2-iodobenzoic acid, 3-iodobenzoic acid, 4-iodobenzoic acid, and 2,2'-dithiobenzoic acid,
    wherein an FT-IR spectrum of the polyarylene sulfide shows a first peak between 1400 and 1600 cm$^{-1}$ and a second peak between 1600 and 1800 cm$^{-1}$, wherein a height intensity of the second peak is between about 0.5% and about 10% of a height intensity of the first peak, and
    wherein the compound having carboxyl group is added thereto when the degree of the polymerization reaction is progressed 90% or more, wherein the degree of polymerization reaction is determined by the ratio of present viscosity to target viscosity.

2. The polyarylene sulfide according to claim 1, wherein the melting temperature is 265 to 290° C.

3. The polyarylene sulfide according to claim 1, wherein the number average molecular weight is 5,000 to 50,000.

4. The polyarylene sulfide according to claim 1, wherein the melt viscosity measured with a rotational viscometer at 300° C. is 10 to 50,000 poise.

5. The polyarylene sulfide according to claim 1, wherein the tensile strength measured according to ASTM D 638 is 100 to 900 kgf/cm$^2$.

6. The polyarylene sulfide according to claim 1, wherein the elongation measured according to ASTM D 638 is 1 to 10%.

7. The polyarylene sulfide according to claim 1, wherein the flexural strength measured according to ASTM D 790 is 100 to 2,000 kgf/cm$^2$.

8. The polyarylene sulfide according to claim 1, wherein the impact strength measured according to ASTM D 256 is 1 to 100 J/m.

9. The polyarylene sulfide according to claim 1, wherein the compound having carboxyl group is added thereto in the amount of 0.0001 to 5 parts by weight, based on 100 parts by weight of the diiodoaromatic compound.

10. The polyarylene sulfide according to claim 1, wherein the diiodoaromatic compound is one more compounds selected from the group consisting of diiodobenzene, diiodonaphthalene, diiodobiphenyl, diiodobisphenol, and diiodobenzophenone.

11. The polyarylene sulfide according to claim 1, wherein polymerizing step is carried out for 1 to 30 hours by varying the temperature and pressure from the initial reaction condition of 180 to 250° C. and 50 to 450 torr to the final reaction condition of 270 to 350° C. and 0.001 to 20 torr.

12. The polyarylene sulfide according to claim 1, wherein the method further includes the step of melt-mixing the reactant including the diiodoaromatic compound and sulfur element, before the polymerizing step.

13. A shaped article, including the polyarylene sulfide according to claim 1.

14. The shaped article according to claim 13, which is a form of film, sheet, or fiber.

* * * * *